May 7, 1935.   O. EISENHUT   2,000,224
PRODUCTION OF GASEOUS MIXTURES CONTAINING HYDROGEN
Filed Nov. 1, 1929
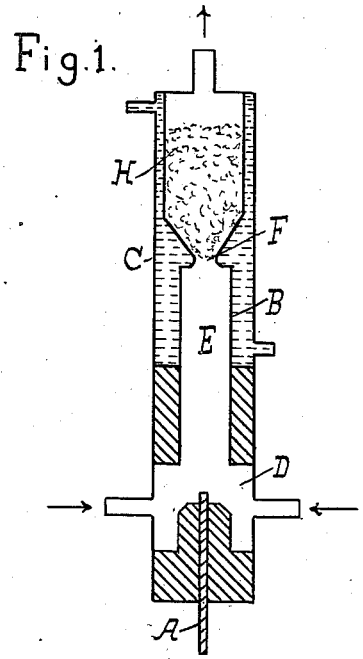
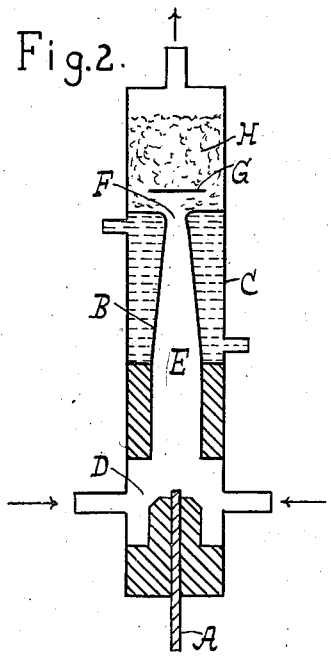
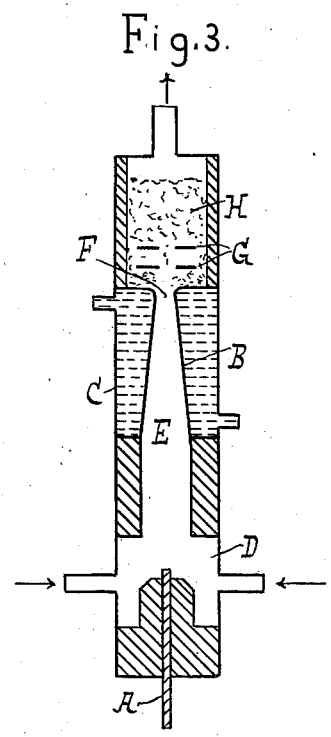
Inventor
Otto Eisenhut
By his Attorneys Patented May 7, 1935

UNITED STATES PATENT OFFICE 2,000,224

2,000,224

PRODUCTION OF GASEOUS MIXTURES CONTAINING HYDROGEN

Otto Eisenhut, Heidelberg, Germany, assignor to I. G. Farbenindustrie Aktiengesellschaft, Frankfort-on-the-Main, Germany, a corporation of Germany Application November 1, 1929, Serial No. 404,081
In Germany November 26, 1928

4 Claims. (Cl. 204—31)

This invention relates to improvements in the manufacture and production of gaseous mixtures containing hydrogen such as mixtures of nitrogen and hydrogen.

A process for the conversion of solid, liquid or gaseous carbonaceous materials containing hydrogen or mixtures containing the same as for example methane, coal distillation gases, tars, mineral oils and the like into gases substantially consisting of hydrogen or mixtures of nitrogen and hydrogen which are suitable for the synthesis of ammonia has already been described, according to which these materials are exposed to a treatment with an electric arc together with a gas containing oxygen, namely air, oxygen or carbon dioxide, and with or without the addition of steam the gas mixture obtained being freed from carbon dioxide and any other impurities present after the conversion of the carbon monoxide formed with water vapour, nitrogen or hydrogen being added if necessary. The carbon contained in the initial material is converted to a great extent into carbon monoxide by the treatment in the electric arc, but a complete conversion is attended by difficulties, so that for example when employing initial materials containing methane the gas mixture obtained still contains methane to an undesirable extent. Also in many cases the gas mixture has an undesirable content of carbon dioxide.

I have now found that a gas mixture which is practically free from these undesirable constituents is obtained from solid, liquid or gaseous carbonaceous materials containing hydrogen or mixtures containing the same as for example methane, coal distillation gases, tars, mineral oils and the like by treatment with an electric arc together with a gas containing oxygen, namely air, oxygen or carbon dioxide, and with or without the addition of steam, when care is taken that substantially all parts of the gas mixture which is exposed to the treatment in the electric arc have attained or been exposed to a temperature of at least 1400° centigrade. In consequence the gases will usually have this temperature at the end of or after leaving the electric arc. For this purpose devices may be provided in the electric arc chamber, which produce an intimate and thorough mixing of the gas mixture, such as one or more narrow exit openings arranged immediately behind the electric arc, or deflecting plates arranged at the end of the electric arc and the like. In this manner the otherwise readily occurring formation of zones of lower temperature than is necessary for the conversion is prevented, on the contrary in consequence of the fact that eddies are formed by means of the said devices, the whole of the gas mixture to be treated passes through the electric arc zone itself or at least flows past in close proximity thereto and practically all parts of the mixture have been exposed to a temperature of at least 1400° centigrade by the time that they leave the electric arc chamber. In this manner for example from methane or gas mixtures containing methane, gases may be readily obtained, the methane content of which can be scarcely detected by means of simple analytical methods and which may be employed for the synthesis of ammonia without further treatment.

It is very advantageous to convert the carbon monoxide formed in the electric arc by means of steam into carbon dioxide and hydrogen and then to remove the carbon dioxide.

I have also found that it is frequently advantageous in the process described above to replace a part of the air which is added before the treatment in the electric arc, by carbon dioxide. This latter is converted into carbon monoxide by the treatment in the electric arc and the oxygen thus given off serves in the same manner as the oxygen in the aforesaid oxygen-containing gas for the conversion of the carbon contained in the hydrocarbons employed into carbon monoxide with the formation of hydrogen. This manner of working constitutes a means whereby in a simple manner, without the subsequent addition of hydrogen, a gas mixture may be obtained in which the proportions of nitrogen and hydrogen correspond more accurately to the ratio of 1 to 3 than would otherwise be the case, because the nitrogen content of the final gas mixture, which is usually somewhat higher than corresponds to the ratio 1 to 3, is reduced in favour of the hydrogen content by the addition of air diluted with carbon dioxide before the treatment in the electric arc.

By employing as the said addition, the carbon dioxide prepared from the carbon monoxide contained in the gas mixture obtained after the treatment in the electric arc, the further advantage is obtained that this by-product is rendered utilizable for the process itself.

The process according to the present invention may be carried out under any desired pressure, for example at elevated, atmospheric or reduced pressure.

The nature of this invention will be further described with reference to the accompanying drawing, which shows modifications of arc furnaces suitable for carrying out the process according to the present invention.

In Figures 1, 2 and 3, A and B denote the electrodes, C is a jacket through which a suitable cooling medium such as water may be passed. The gases to be treated are introduced at D. The arc space is shown at E. F is a narrow opening separating the arc space from the mixing chamber H which may contain baffle-plates G, by which means a thorough intermingling of the still hot gases is brought about.

The following examples will further illustrate the nature of this invention but the invention is not restricted to these examples.

Example 1

6.5 cubic metres of hydrogen having a content of about 6 per cent of methane and 2 per cent of unsaturated hydrocarbons such as ethylene are mixed with 2.2 cubic metres of air and the flowing mixture is exposed to the action of an electric arc in a furnace provided with a narrow exit opening arranged directly behind the electric arc as illustrated in Figure 1. About 9.5 cubic metres of a gas mixture are obtained which has approximately the following composition: 20.5 per cent of nitrogen, 73.5 per cent of hydrogen, 6.0 per cent of carbon monoxide and small traces of methane.

After removal of the carbon monoxide the gas mixture may be employed for the synthesis of ammonia without further treatment. The energy required amounts to from 0.5 to 1 kilowatt hour per cubic metre of gas mixture formed without taking into account the amount of energy which may be recovered by heat regeneration by preheating the initial gas mixture by means of the heat contained in the effluent gases.

Example 2

1 cubic metre of methane is mixed with about 1 cubic metre of air and 1 cubic metre of steam and the mixture is passed through an electric arc at the end of which a series of deflecting plates is arranged as illustrated in Figure 3. From 4 to 4.5 cubic metres of a gas mixture are obtained, which has the following composition: 19.1 per cent of nitrogen, 59.2 per cent of hydrogen, 21.4 per cent of carbon monoxide, the remainder being carbon dioxide, hydrocarbons ($C_mH_n$), ($n$ being $=<2m$) and oxygen.

The energy required corresponds to that specified in Example 1.

Example 3

1.8 cubic metres of methane are mixed with about 2.5 cubic metres of air and about 0.8 cubic metre of carbon dioxide and this gas mixture is exposed to treatment with the electric arc, a current of 2.6 amperes and 1400 volts being employed for the operation of the arc. In this manner about 7.5 cubic metres of a gas mixture, which contains 42 per cent of hydrogen, 26 per cent of nitrogen and 32 per cent of carbon monoxide and only very small quantities of unsaturated hydrocarbons, methane and carbon dioxide are obtained. After catalytic conversion of the carbon monoxide into carbon dioxide and hydrogen by means of steam in the presence of nickel and after removal of the carbon dioxide by absorption a gas mixture is obtained which contains nitrogen and hydrogen in the ratio of 1 to 3. A part of the carbon dioxide which has been removed may be again exposed to treatment in the electric arc together with fresh quantities of methane and air.

What I claim is:—

1. A process for the production of gas mixtures containing hydrogen which comprises exposing a mixture of carbonaceous material containing combined hydrogen and a gas containing oxygen selected from the class consisting of carbon dioxide and gases comprising free oxygen to the action of an electric arc while taking care that all parts of the gas mixture which is subjected to the treatment are exposed to a temperature of at least 1400° C. by impeding the exit of the reacting gases from the electric arc.

2. A process for the production of gas mixtures containing hydrogen which comprises exposing a mixture of carbonaceous material containing combined hydrogen with a gas containing oxygen selected from the class consisting of carbon dioxide and gases comprising free oxygen to the action of an electric arc while taking care that all parts of the gas mixture which is subjected to the treatment are exposed to a temperature of at least 1400° C. by causing a thorough intermixing of the reacting materials in the arc by causing them to leave the arc through a narrow exit passage located directly beyond the arc.

3. The process according to claim 1 in which the oxidizing gas employed is air.

4. The process according to claim 1 in which any carbon monoxide formed in the electric arc treatment is reacted with steam to produce further quantities of hydrogen.

OTTO EISENHUT.